United States Patent [19]

Pflaum

[11] 4,372,205
[45] Feb. 8, 1983

[54] APPARATUS FOR BENDING A PRESSURE ROLL OF A ROTARY PRINTING PRESS

[75] Inventor: August Pflaum, Augsburg, Fed. Rep. of Germany

[73] Assignee: M.A.N.-ROLAND Druckmaschinen Aktiengesellschaft, Augsburg, Fed. Rep. of Germany

[21] Appl. No.: 193,466

[22] Filed: Oct. 3, 1980

[30] Foreign Application Priority Data

Oct. 9, 1979 [DE] Fed. Rep. of Germany ....... 2940878
Feb. 15, 1980 [DE] Fed. Rep. of Germany ....... 3005690

[51] Int. Cl.³ .......................... B41F 9/06; B41F 13/26
[52] U.S. Cl. .................................. 101/153; 101/216; 29/116 AD
[58] Field of Search ............. 101/152, 153, 216, 219, 101/212, 247, 218; 29/116 AD, 113 AD; 100/162 B

[56] References Cited

U.S. PATENT DOCUMENTS

| | | | |
|---|---|---|---|
| 2,825,217 | 3/1958 | Byrd | 100/162 B |
| 3,097,591 | 7/1963 | Justus | 29/116 AD X |
| 3,672,018 | 6/1972 | Junk et al. | 29/116 AD |
| 3,676,909 | 7/1972 | Tuomaala | 29/113 AD X |
| 3,685,443 | 8/1972 | Kusters | 101/153 |
| 3,745,625 | 7/1973 | Jaegers et al. | 29/116 AD X |
| 3,983,811 | 10/1976 | Kobler et al. | 100/162 B X |

FOREIGN PATENT DOCUMENTS 1292957 4/1969 Fed. Rep. of Germany ........ 29/116 AD
1270007 4/1972 United Kingdom ................ 101/153

Primary Examiner—J. Reed Fisher
Attorney, Agent, or Firm—Frishauf, Holtz, Goodman & Woodward

[57] ABSTRACT

A lever at each end of a pressure roll has one arm connecting with means for applying a force thereto and another arm applying a bending moment through rotary bearings to the shell of a pressure roll. In one embodiment, the axle is non-rotating and is forked at the ends and mounted in a sliding carriage on stationary supports there, on which carriage a pressure and cylinder and piston are provided for carrying a force to a lever pivoted on a pin bridging the fork of the axle end to apply the bending moment to the roll shell through a rotary bearing. In another embodiment, the axle is rotary and connected at various places intermediate the roll ends by connection pieces past which bending moments may be transmitted and the lever is tubular and mounted on a stub of the axle by a swing bearing, and the bending moment is transferred to the shell by another swing bearing. Application of force to the lever for bending the roll shell in this case can be done manually with a set screw.

4 Claims, 4 Drawing Figures

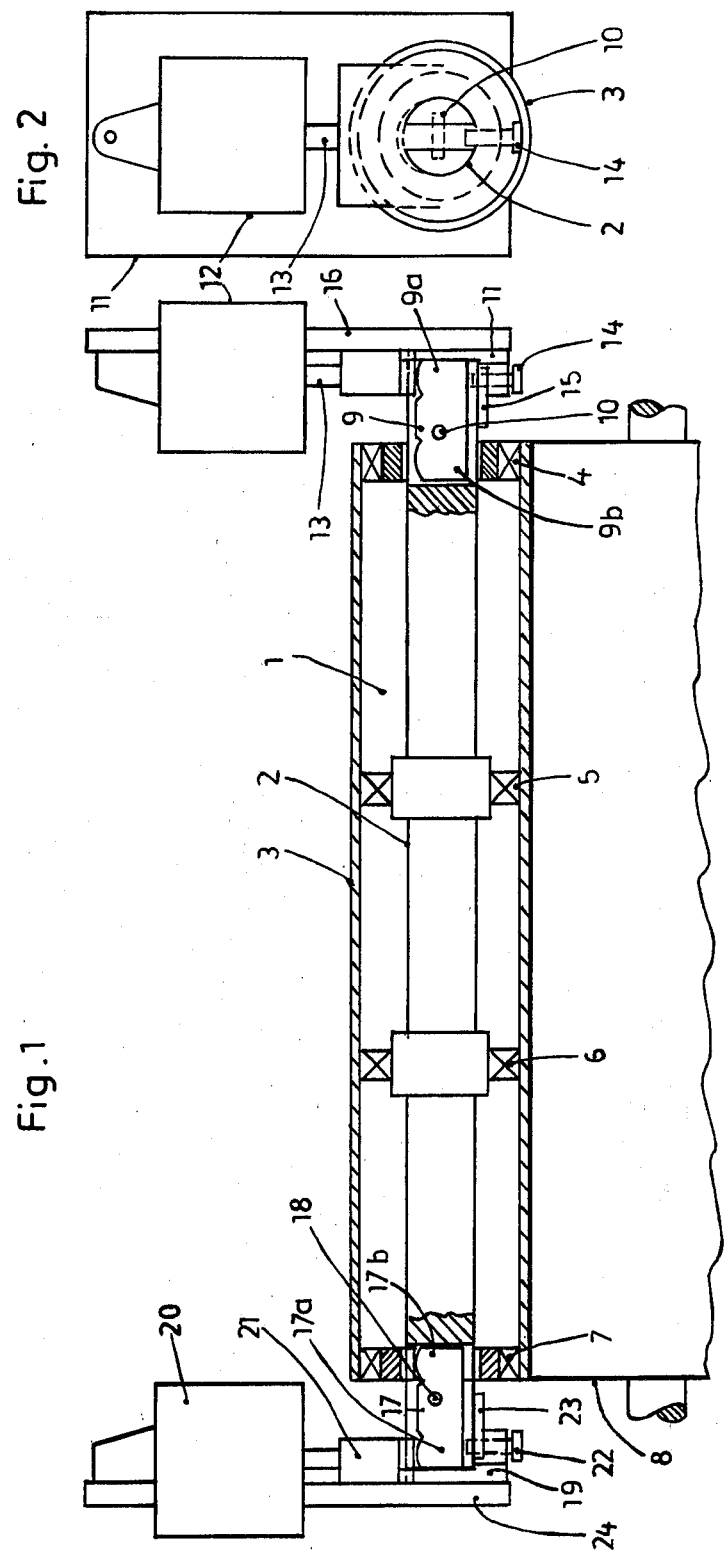

APPARATUS FOR BENDING A PRESSURE ROLL OF A ROTARY PRINTING PRESS

The invention concerns apparatus for bending a pressure roll consisting of an axle and a cylindrical shell mounted on the axle at least in part by rotary bearings, and disposed parallel to a counter-cylinder or -roll of a rotary printing press.

In printing presses, for example rotogravure presses, two cylinders are pressed against each other in the printing process. It is known by pressing a cylinder or roll mounted on bearings at both ends against a second cylinder or roll mounted parallel to the first to bend the cylinders. The bending is greater in the middle than at the end. The weight of a cylinder or roll itself is also responsible for some bending, along with any applied pressure. The requirement for obtaining a good printing result is that the applied pressure should be constant across the entire line of contact of the two rolls, so that provision of suitable correction or compensation apparatus for bending the cylinders or rolls is involved.

A counter-pressure cylinder for a rotogravure press is known from Swiss Pat. No. 456 649, in which the cylinder is of two parts, namely a shell and an axle disposed within the shell. For avoiding the problem discussed above regarding bending, in the counter-pressure cylinder known from the aforesaid patent, the shell and the axle are in contact with each other only for a predetermined length in the middle of the roll. Furthermore, in this known counter-pressure cylinder, the shell ends have profiles deviating from that of the middle portion. A cylinder so constituted is expensive and in spite of these features does not completely exclude the risk of the cylinder bending out of line.

From the prior patent application of the assignee of the present application filed in Germany as No. P 29 19 479.4-27 (U.S. patent application Ser. No. 147,207) an apparatus for bending a pressure cylinder consisting of an axle and a surrounding shell and disposed parallel to a cylinder has become known for which a pulling device arranged parallel to the pressure-roll exerts a bending moment on the axle by means of parallel brackets disposed on the ends of the stationary axle of the pressure-roll, which force is then transferred to the shell through bearings arranged between the axle and the shell of the pressure-roll. In this apparatus, there is the disadvantage that a pulling device in the form of a tension rod is necessary that runs parallel to the pressure roll. The presence of that rod impairs the accessibility of the cylinders or rolls.

THE INVENTION

It is an object of the present invention to provide apparatus for bending a pressure roll in which the use of pulling devices running parallel to the axle are not necessary.

In accordance with the invention, a pivoted lever swingable in the bending plate of the pressure roll is provided bearing on the axle between an end of the pressure roll and a sidewall or frame member in which the axle is seated, the lever having a first lever arm and means for applying a force thereto developing an angular moment about the pivot, a second lever arm being provided for exerting a bending moment on the shell through a rotary bearing.

In the preferred embodiment, the axle is rotary and connected to the shell by connecting pieces welded in at various places in a way permitting the transmission of bending moment, and the lever is tubular, at least in part, and connected to swing bearings on an axle stub, which is itself mounted in bearings on a stationary support, the second lever arm applying a force to the shell at its end through swing bearings. In this case, the bending force may be applied quite simply by turning a set screw, although other ways of applying for force are possible. Symmetrical arrangements for applying cooperating bending moments on the two ends of the shell are preferred.

The apparatus of the invention is suitable, for example, for use on a bending-presser by means of which the bending line of a pressure roll can be fitted to that of the printing cylinder of a rotogravure press. By the use of the apparatus of the invention applying force on the two ends of such a bending-pressure, an individual adjustment of the bending moment and thus of the bending line of the presser, according to position, length and magnitude of the bending, as well as the operating pressure of the presser roll ends referred to the counter-cylinder, is possible.

With the tubular constitution of the lever and its support on a bearing provided on an axle stub, in accordance with the preferred embodiment described below, it is possible to mount the axle in bearings in stationary supports at its ends, in the frame member, so that the bending moment applied to the shell for the bending of the presser acts through one or more connection pieces, for example welded into place, between the shell and the axle. Thus, exerting the bending moment can be performed manually by a set screw bearing on a lever arm automatically by a positioning motor or a pneumatic or hydraulic cylinder. In comparison to pressure rolls with inner bearings, the pressure roll in this case has a simpler construction and is therefore cheaper to manufacture. Furthermore, without expensive supplementary provisions, the pressure roll can be cooled with air, since a through passage can be formed between the roll shell and the axle.

BRIEF DESCRIPTION OF THE DRAWINGS

The invention is further described by way of illustrative example with reference to the annexed drawings, in which:

FIG. 1 is a longitudinal section through a bending-presser having a bending device according to the invention;

FIG. 2 is a side view of the apparatus of FIG. 1, and

DESCRIPTION OF THE ILLUSTRATED EMBODIMENTS

Figure 3:
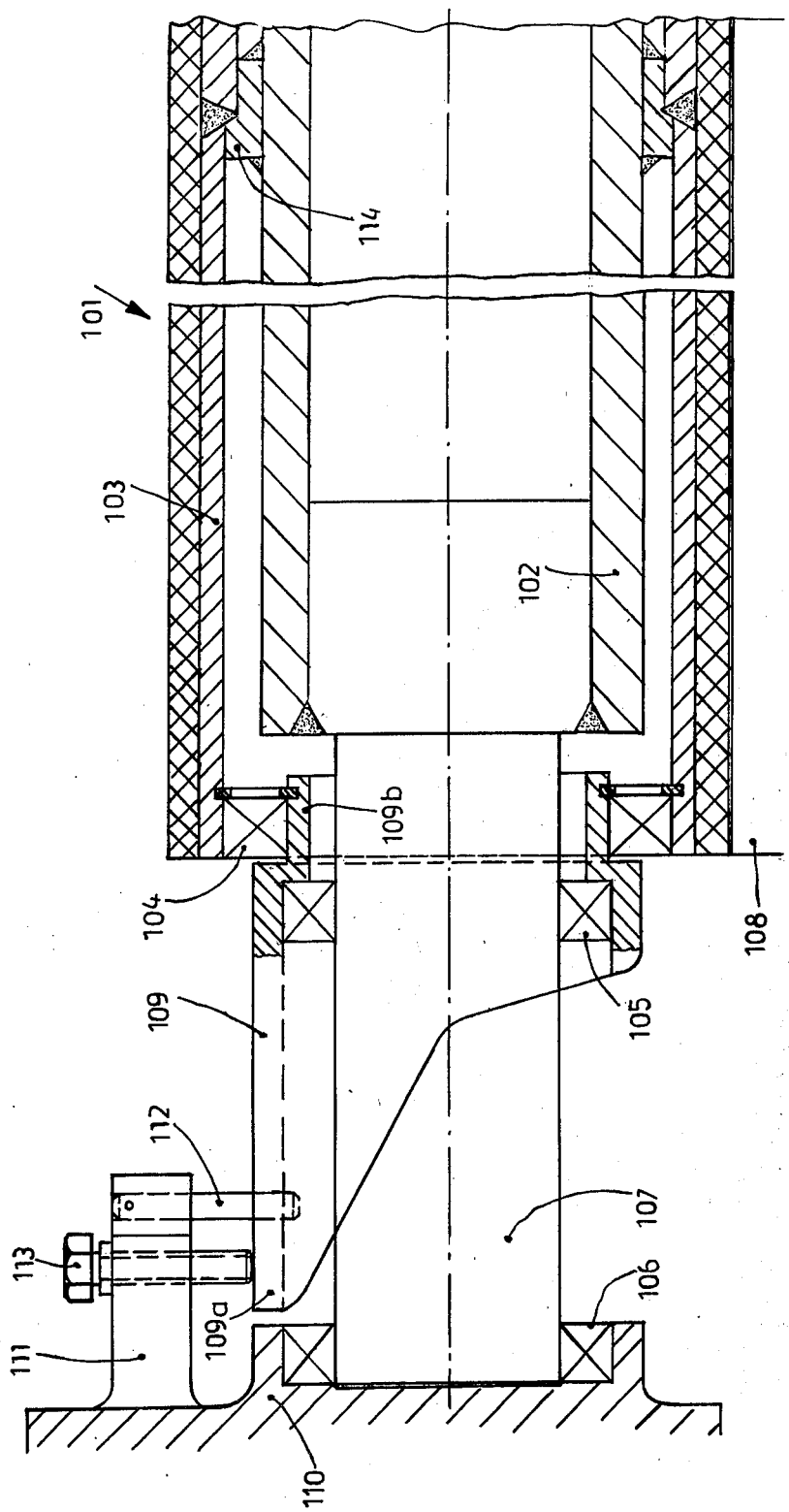
FIG. 3 is a longitudinal section of a second embodiment of the invention in which the lever is of tubular shape.
Figure 4:
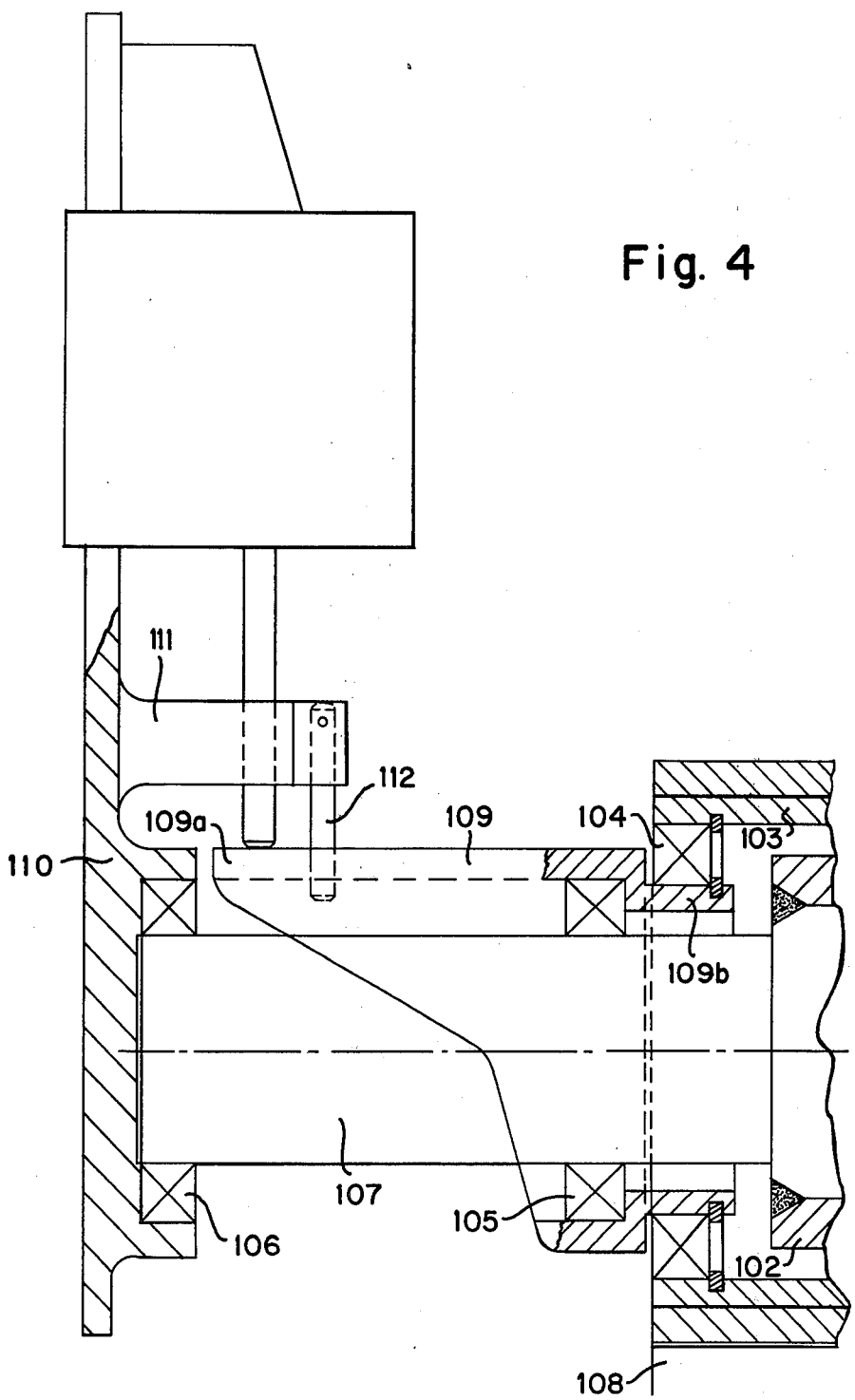

In FIGS. 1 and 2, a pressure roll used as a bending-presser 1 is composed of a fixed and therefore non-rotating axle 2 and a cylindrical shell 3 mounted on the axle. The shell 3 is supported on the axle 2 by bearings 4, 5, 6 and 7. Parallel to the bending-presser 1, a pressure cylinder 8 is disposed, operating as counter cylinder. The pressure cylinder 8 is mountable against a printing cylinder not shown in the drawings. The bending line of the pressure cylinder 8 can be exactly fitted to the printing cylinder by means of the bending-presser 1.

The ends of the axle 2 are forked. On the righthand end, between the two fork branches of the axle 2, a lever 9 is shown. The lever 9 can be swung about a pivot pin 10 which is fastened on the two fork ends of the axle 2. The right end of the axle 2 is fixed on a sliding carriage 11 to which there is also connected a pneumatic cylinder 12. The pneumatic cylinder 12 exerts a force through its piston 13 on the first or righthand lever arm 9a of the lever 9 upon corresponding actuation, whereby the lever 9 is caused to swing clockwise, so that its second or lefthand lever arm 9b exerts a bending torque through the bearing 4 onto the roll shell 3, as the result of which the shell 3 of the presser can be bent down in its mid-region. The extent of swinging of the lever 9 in the clockwise direction can be preset by a stop 14 provided in the form of a set screw. Thus, by the stop 14 the bending of the righthand part of the shell 3 in the upward direction and thereby its bending downward in the mid-region to a desired extent can be exactly set.

When the lever 9 is swung in the clockwise direction by the pneumatic cylinder 12 so far that the lever arm 9a comes against the stop 14, there takes place the transfer of the force delivered by the pneumatic cylinder 12 over the stop 14, which is connected to the axle 2 through the holder 15, and the bearing 4 to the righthand end region of the pressure cylinder 8 operating as counter-cylinder and lying therebelow.

On the left side of the bending-presser 1 is a second deforming device that is identical in construction and effect with the corresponding device on the right side that has just been described. It consists of a lever 17 that is capable of being swung on a pivot pin 18 held between the forked end of the axle 2. The left end of the axle 2 is fastened to a sliding carriage 19 which is also connected to the pneumatic cylinder 20. The piston 21 of the pneumatic cylinder operates on a lever arm 17a of the lever 17, so that the other lever arm 17b exerts a torque through the bearing 7 on the shell 3 of the presser 1 that corresponds in direction with the torque produced by the device at the righthand end.

The extent of swing of the lever 17, and hence of the lever arm 17a, by actuation of the pneumatic cylinder 20 is limited by a stop 22 that can consist for example of a screw. The stop 22 is held in fixed local relation to the axis 2 by a holder 23.

The sliding carriage 11 at the righthand side is fastened to the sidewall 16 and the carriage 19 at the lefthand side to the sidewall 24. It is thus possible, even with different diameters of the various cylinders that may be used from time to time, to provide corresponding pressure of the presser 1 and of the pneumatic cylinders 12 and 20 associated with the sliding carriages, a feature which constitutes a substantial further advantage.

In practice, the bending of the axle 2 by pressure of the presser 1 produced by the pneumatic cylinder 12 over the lever arm 9a, the stop 14, the holder 15 and the bearing 4 onto the pressure cylinder 8, or through the pneumatic cylinder 20, over the lever arm 17a, the stop 22, the holder 23 and the bearing 7 is usually negligible, since the bending values of the shell 3 and the axle 2 with relation to the length of the presser 1 can be brought into the desired relations by a suitable choice of the strength of the materials of which these components are made.

In FIG. 3, the bending presser 101, shown only as to the portions to which the invention pertains consists of a tubular rotating axle 102 on which a shell 103 is disposed concentrically at a spacing therefrom. At one side of the shell 103 are shown the shell bearings 104 that transfer the bending force. The bending torque transfer levers 109, advantageously constituted in tubular form, are disposed on swing bearings 105 which are fitted on axle stubs 107 seated in presser bearings 106. Preferably self-aligning roller bearings, such as barrel-shaped roller bearings are selected for the presser bearings 106.

The bending-presser 101 is parallel to a counter cylinder or roll 108 which is only schematically indicated in FIG. 3. The tubular lever 109 supported on the bearing 105 has two lever arms 109a and 109b. A traverse 111 is affixed to the sidewall 110 in which the presser bearing 106 is provided. The lever 109 is fixed circumferentially and, if desired, also axially, by a locating stud 112 having one end seated in the traverse 111 and the other grasping into the lever arm 109a.

The traverse 111 also has a tapped bore—preferably with fine threads—in which a set-screw 13 is seated that bears against the first lever arm 109a.

Between the tubular axle 102 and the shell 103 surrounding it, a connection piece 114 transferring the applied bending moment is welded on. It will be understood that instead of a ring-shaped connection piece 114, it is also possible to weld on a number of individual connection pieces between the axle 102 and the shell 103. The tubular axle 102 is welded on both ends with the axle stubs 107 partly extending into tubular axle 102.

In the above-described constitution of the bending-presser 101, it is possible to replace the externally disposed bearings without great expenditure of time and in a simple way.

The setting of the bending force operating on the bending-presser 101 can be done by turning the set-screw 113. An automatic setting of the bending force can be provided by the use of a positioning motor or a pneumatic cylinder instead of the set screw 113. The bending force applied to the first lever arm 109a is transferred through the second lever arm 109b and the bearing 104 to the shell 103, so that the latter is pressed upwards. The upwards acting moment produces a downward bending of the bending-presser 101 through the connection piece 114, so that the bending-presser can be fitted to the bending of the pressure cylinder 108. In order to make possible a fitting of the bending-presser 101 to the pressure cylinder 108, the sidewall 110 can for example be constituted in the form of a sliding carriage (not shown) fastened to the frame of a printing press.

Although the invention has been described with reference to a particular illustrative embodiment, it will be understood that modifications and variations are possible within the inventive concept.

I claim:

1. Apparatus for bending a pressure roll of a rotary printing press which is composed of an axle and a cylindrical shell mounted on the axle and maintained parallel to a counter-cylinder or counter-roll, said apparatus including the improvement wherein:

said axle is a rotary axle on which said shell is fixed by at least one connection piece (14) of a configuration permitting transmission of bending moments exerted on said shell;

a pivoted lever (109), swingable in the bending plane of the pressure roll (101) and at least partly tubular, is provided which has a tubular portion surrounding at least the inner portion of the adjacent axle stub end (107) and supported and bearing on said axle end by means of a first swing bearing (105) between an end of the pressure roll and a sidewall member (110) in which said axle is supported by a bearing, said lever having a first lever arm (109a) for application thereto of a force generating an angular moment about the pivot of the lever and a tubular second lever arm (109a) having a second swing bearing for exerting a bending moment on said shell (103) through said second swing bearing (104), and means are provided for applying said force to said first lever arm (109a) in order to cause said second lever arm (109b) to exert bending moment on said shell, said force applying means including means (112) for circumferentially fixing said lever.

2. Apparatus as defined in claim 1, in which said means for circumferentially fixing said at least partially tubular lever includes a pin (112) held in a sidewall traverse (111) and in which, further, said force applying means also include a set-screw (113) threaded in said sidewall traverse (111) for applying a said force to said first lever arm (109a).

3. Apparatus as defined in claim 1, in which each stub end portion (107) of said axle is held in said sidewall member (110) by means of a self-aligning roller bearing (106).

4. Apparatus as defined in claim 1, in which said force applying means include an hydraulic or pneumatic cylinder and piston, said cylinder being fastened to said sidewall or frame.

* * * * *